(12) United States Patent
Meyer

(10) Patent No.: US 11,284,747 B2
(45) Date of Patent: Mar. 29, 2022

(54) CHOP RACK

(71) Applicant: Steve Meyer, Van Meter, IA (US)

(72) Inventor: Steve Meyer, Van Meter, IA (US)

(*) Notice: Subject to any disclaimer, the term of this patent is extended or adjusted under 35 U.S.C. 154(b) by 219 days.

(21) Appl. No.: 16/059,530

(22) Filed: Aug. 9, 2018

(65) Prior Publication Data
US 2018/0344092 A1 Dec. 6, 2018

Related U.S. Application Data

(60) Continuation-in-part of application No. 15/934,446, filed on Mar. 23, 2018, now Pat. No. 10,182,683, which is a division of application No. 14/833,587, filed on Aug. 24, 2015, now Pat. No. 9,962,039.

(60) Provisional application No. 62/041,976, filed on Aug. 26, 2014.

(51) Int. Cl.
*A47J 37/06* (2006.01)
*A47J 43/18* (2006.01)

(52) U.S. Cl.
CPC .......... *A47J 43/18* (2013.01); *A47J 37/0694* (2013.01)

(58) Field of Classification Search
CPC ........ A47J 37/04; A47J 37/043; A47J 37/047; A47J 37/049; A47J 37/0694; A47J 43/18
USPC .................... 99/444, 448, 449, 450; D7/402, D7/354–359, 362–367, 409–411; 126/9 B, 9 R, 25 A, 25 AA, 25 R, 29, 38, 126/39 B, 41 A, 41 B, 265; 211/85.4
See application file for complete search history.

(56) References Cited

U.S. PATENT DOCUMENTS

| | | | | |
|---|---|---|---|---|
| 532,729 A | * | 1/1895 | Glassmeyer | A47J 37/106 99/345 |
| 573,045 A | * | 12/1896 | Snyder | F24C 15/08 126/275 R |
| 1,630,471 A | * | 5/1927 | Collins | A47J 37/108 294/144 |
| 1,819,660 A | * | 8/1931 | Stone | A47J 37/10 126/339 |
| 1,862,420 A | * | 6/1932 | O'Brien | A47J 37/067 99/446 |
| 2,158,805 A | * | 5/1939 | Smith | F24B 1/202 126/25 A |
| 2,247,612 A | * | 7/1941 | Haislip | F24B 1/205 126/25 A |
| 2,616,360 A | * | 11/1952 | Thompson | A47J 37/0694 99/347 |
| 2,959,165 A | * | 11/1960 | Mark | A47J 37/0763 126/304 R |

(Continued)

OTHER PUBLICATIONS

Oak & Cherry Smoked Pork Chops—The BBQ Brethren Forums. (Feb. 11, 2012). Retrieved Oct. 11, 2016, from <http://www.bbq-brethren.com/forum/showthread.php?t=125925> (Year: 2012).*

*Primary Examiner* — Joshua E Rodden
(74) *Attorney, Agent, or Firm* — Zarley Law Firm, P.L.C.

(57) ABSTRACT

The present invention relates to a chop rack for cooking or grilling meat products from the inside out through a bone of the meat product in a bone-down configuration. The bone is exposed to direct heat from a heat source through a slot positioned on the middle portion of a tray. One or more support frames are insertably received in the tray to prevent the meat product from falling over. A sidewall of the tray traps grease, preventing the grease from igniting. Any grease falling through the slot provides additional heat to the bone.

19 Claims, 5 Drawing Sheets

(56) References Cited

U.S. PATENT DOCUMENTS

| | | | | |
|---|---|---|---|---|
| 3,289,571 A | * | 12/1966 | Lewus | A47J 27/04 126/369 |
| 3,306,281 A | * | 2/1967 | Hoebel | A47J 37/0763 126/25 R |
| 3,613,552 A | * | 10/1971 | Kean | A47J 43/18 294/152 |
| 3,648,679 A | * | 3/1972 | Quinn | A47J 37/0763 126/25 A |
| 3,793,936 A | * | 2/1974 | Wills | A47J 37/10 99/339 |
| 3,828,759 A | * | 8/1974 | Cooper | A47J 37/0763 126/25 R |
| 3,972,318 A | * | 8/1976 | Lenoir | A47J 37/10 126/348 |
| D256,654 S | * | 9/1980 | Painter | D7/409 |
| 4,291,616 A | * | 9/1981 | Taylor | A47J 37/108 99/446 |
| 4,559,869 A | * | 12/1985 | Hogan | A47J 37/0694 211/184 |
| 4,566,429 A | * | 1/1986 | Williams | A47J 37/0704 126/14 |
| 4,974,502 A | * | 12/1990 | Murdock | A47J 37/0694 211/153 |
| 5,720,217 A | * | 2/1998 | Pappas | A47J 37/041 426/523 |
| D417,124 S | * | 11/1999 | Chen | 211/60.1 |
| 7,340,994 B2 | * | 3/2008 | Bruno | A47J 37/067 99/426 |
| D624,787 S | * | 10/2010 | Adams | D7/409 |
| D635,825 S | * | 4/2011 | Borovicka | D7/409 |
| D689,327 S | * | 9/2013 | Ortegon | D7/354 |
| 9,505,542 B2 | * | 11/2016 | France | B65D 81/343 |
| 9,554,671 B2 | * | 1/2017 | Poon | A47J 37/0694 |
| 2015/0342402 A1 | * | 12/2015 | Bombard | A47J 37/0694 99/448 |

\* cited by examiner

CHOP RACK

CROSS REFERENCE TO RELATED APPLICATION

This application is a continuation-in-part of U.S. Ser. No. 15/934,446 filed Mar. 23, 2018, which is a divisional of U.S. application Ser. No. 14/833,587 filed Aug. 24, 2015 and issued on May 8, 2018 as U.S. Pat. No. 9,962,039, which claims the benefit of priority to U.S. Provisional Application No. 62/041,976 filed Aug. 26, 2014, the contents of these applications are hereby incorporated by reference in their entirety.

BACKGROUND OF THE INVENTION

This invention is directed towards a rack for grilling. More specifically, and without limitation, this invention relates to a chop rack for grilling pork chops and the method of using the same.

Cooking a pork loin chop (i.e. a center loin chop, center-cut loin, loin pork chop, pork loin end chop, porterhouse, top-loin chop, Iowa Chop, etc.) is more difficult to cook than other types of pork chops. The pork loin chop comes from the hip and loin toward the rear side of a pig. As a result, the pork loin chop contains a loin, a tenderloin, and a T-shaped bone that separates at least a portion of the two. Each of these components must be cooked slightly differently, which commonly leads to overcooking part or all of the pork loin chop, or cooking it unevenly.

The preferred approach to cooking the pork loin chop is to sear both sides of the pork loin chop and then slowly cooking the pork loin chop with the bone positioned downwardly ("bone-down") at a low temperature. This exposes the bone to direct heating from and in the closest proximity to the fire or heat source of a grill, which in turn heats the bone more rapidly. In turn, the bone as a whole heats up, cooking the pork loin chop from the inside out.

Due to the odd shape of the pork loin chop and bone, along with other environmental and cooking conditions, the ability to cook with the bone down is not easily accomplished. The bone is often unable to stabilize the pork loin chop because the bone itself is not usefully flat, or the pork loin chop in general is either top heavy or misshapen. Further, environmental factors, such as wind and varying temperatures inside the grill can apply force to topple the upright pork loin chop.

The benefit of cooking with the bone-down thus requires constant attention to avoid the pork loin chop falling over. If the pork loin chop would fall over, the pork loin chop has only one side heated, which can ruin the pork loin chop or at least make it a less enjoyable meal. The need to have constant supervision leads to heat being lost as a lid of the grill must be repeatedly opened to view the pork loin chop. Likewise, an individual trying to prepare other parts of a meal are restricted because of the attention demanded by the pork loin chop.

Another issue relates to grease fires caused by grease dripping off the pork loin chop or other meat products being cooked simultaneously. Once the grease catches fire it leads to the portions of the pork loin chop closest to the grease fire being cooked more than those portions further away.

Grease fires and heat flares caused by leaked grease are common with conventional grill tops, including trays with perforations or grease drains that burn the pork loin chop causing burns, uneven cooking, and less enjoyable pork chop loin in taste and aesthetic appeal.

Thus it is a primary objective of this invention to provide a chop rack that improves upon the art.

Another objective of this invention is to provide a chop rack that stabilizes a pork loin chop while cooking or grilling in a bone-down position.

Yet another objective of this invention is to provide a chop rack that consistently exposes a pork loin chop to a heat source.

Another objective of this invention is to provide a chop rack that exposes only a bone of a pork loin chop to direct heat from a heat source.

Yet another objective of this invention is to provide a chop rack that limits grease from leaking and limits the potential of grease fires.

Another objective of this invention is to provide a chop rack that limits exposure to irregular heat in the event of a grease fire.

Yet another objective of this invention is to provide a chop rack that does not require constant supervision.

Another objective of this invention is to provide a chop rack that is simple to use, durable, and cost-effective.

These and other objectives, features, and advantages of the invention will become apparent from the specification and claims.

SUMMARY OF THE INVENTION

In general, the present invention relates to a chop rack for cooking or grilling a pork loin chop. The chop rack includes a tray formed by a base and a continuous sidewall connected to the perimeter of the base. One or more slots extend through the base to allow direct heating from a heat source. The one or more slots are positioned across a middle portion of the base that is otherwise solid. This provides for the greatest heating through the slot when placed on a heat source.

While cooking or grilling, the meat product is positioned bone down over the slot. The bone is heated more rapidly than the rest of the meat product, resulting in the meat product cooking from the inside out. During the cooking or grilling process, any grease that drips from the meat product is retained within the sidewall and on the solid base of the tray. This in turn prevents grease fires from occurring that lead to uneven cooking or burning of the meat product.

A series of notches are formed in the sidewall to receive one or more support frames that provide a physical barrier between meat products while cooking. The support frames are sized and shaped to facilitate both cleaning by removal, and storage by placement on the tray and within the sidewall.

DETAILED DESCRIPTION

Figure 1:
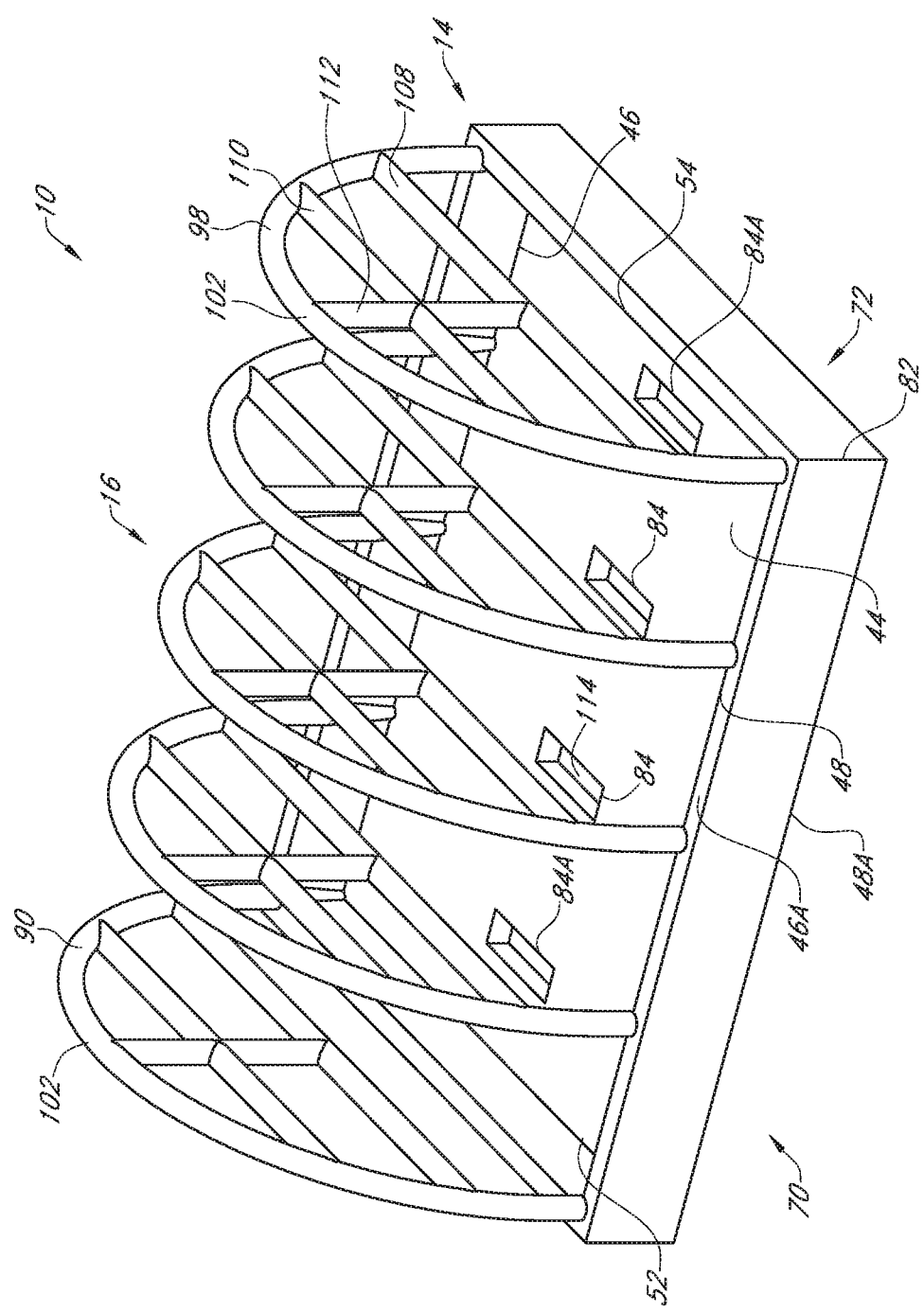
FIG. 1 is a perspective view of a chop rack.
Figure 2:
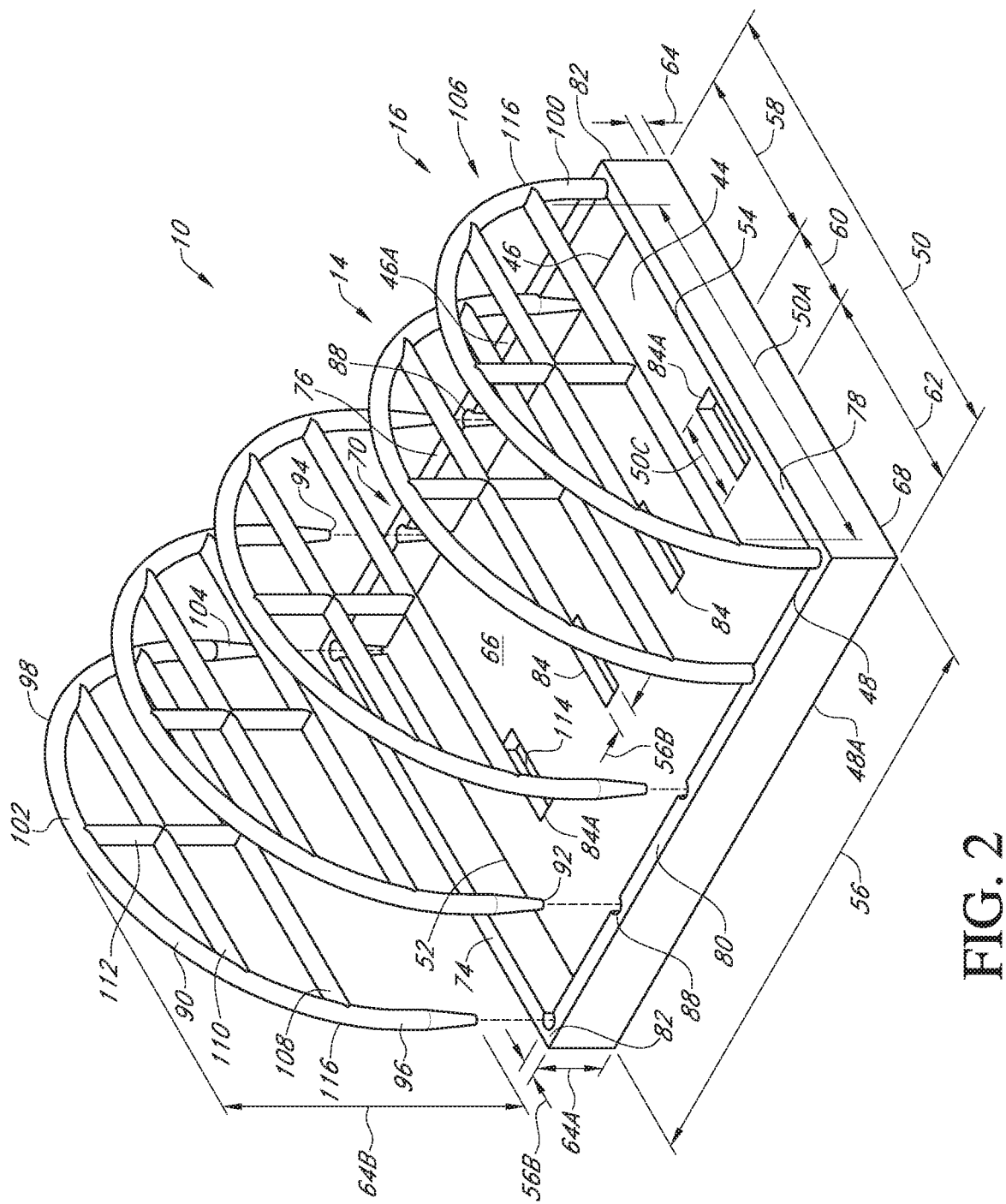
FIG. 2 is a perspective view of the assembly of a chop rack.
Figure 3:
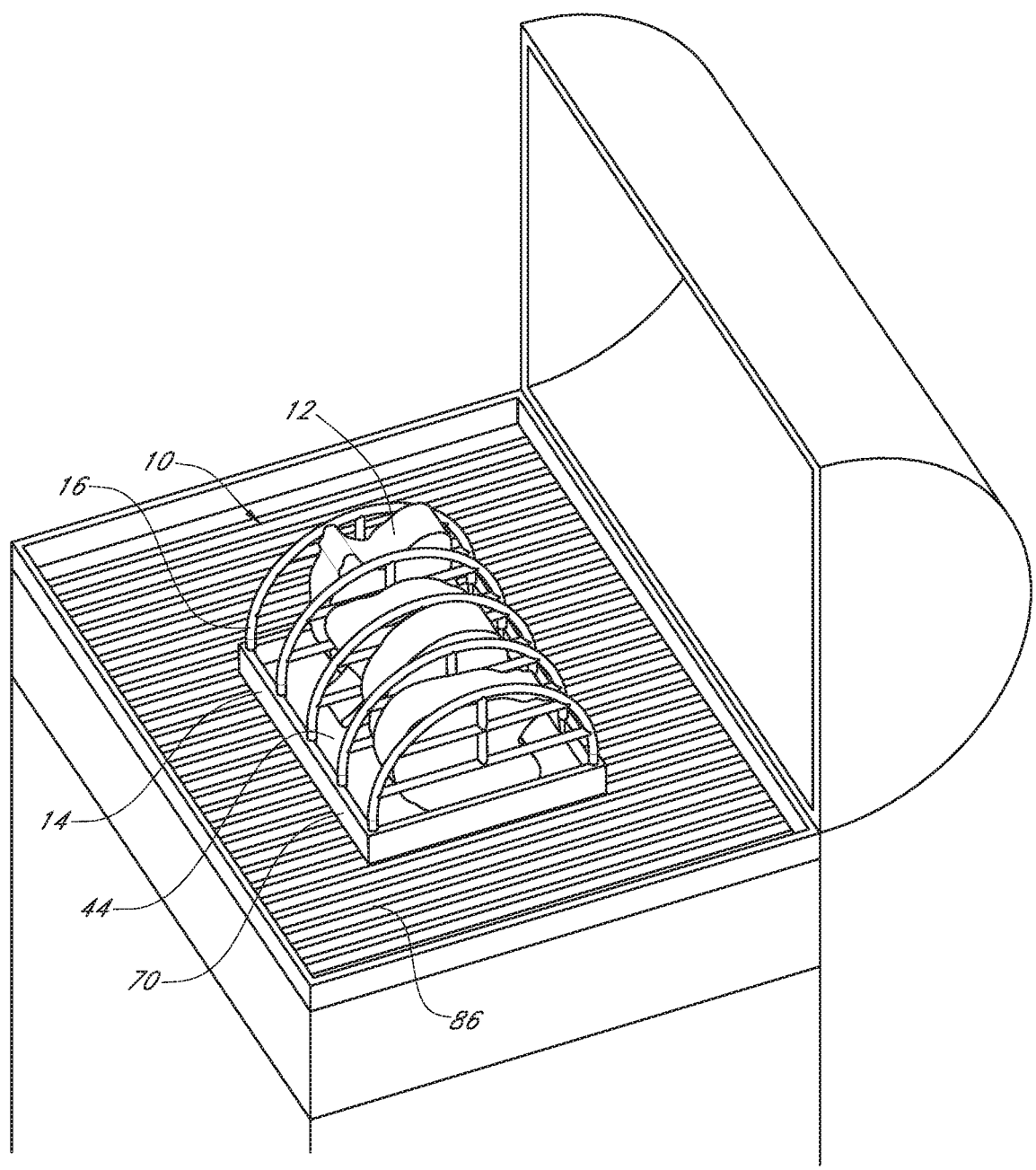
FIG. 3 is a perspective view of a chop rack in operation.
Figure 4:
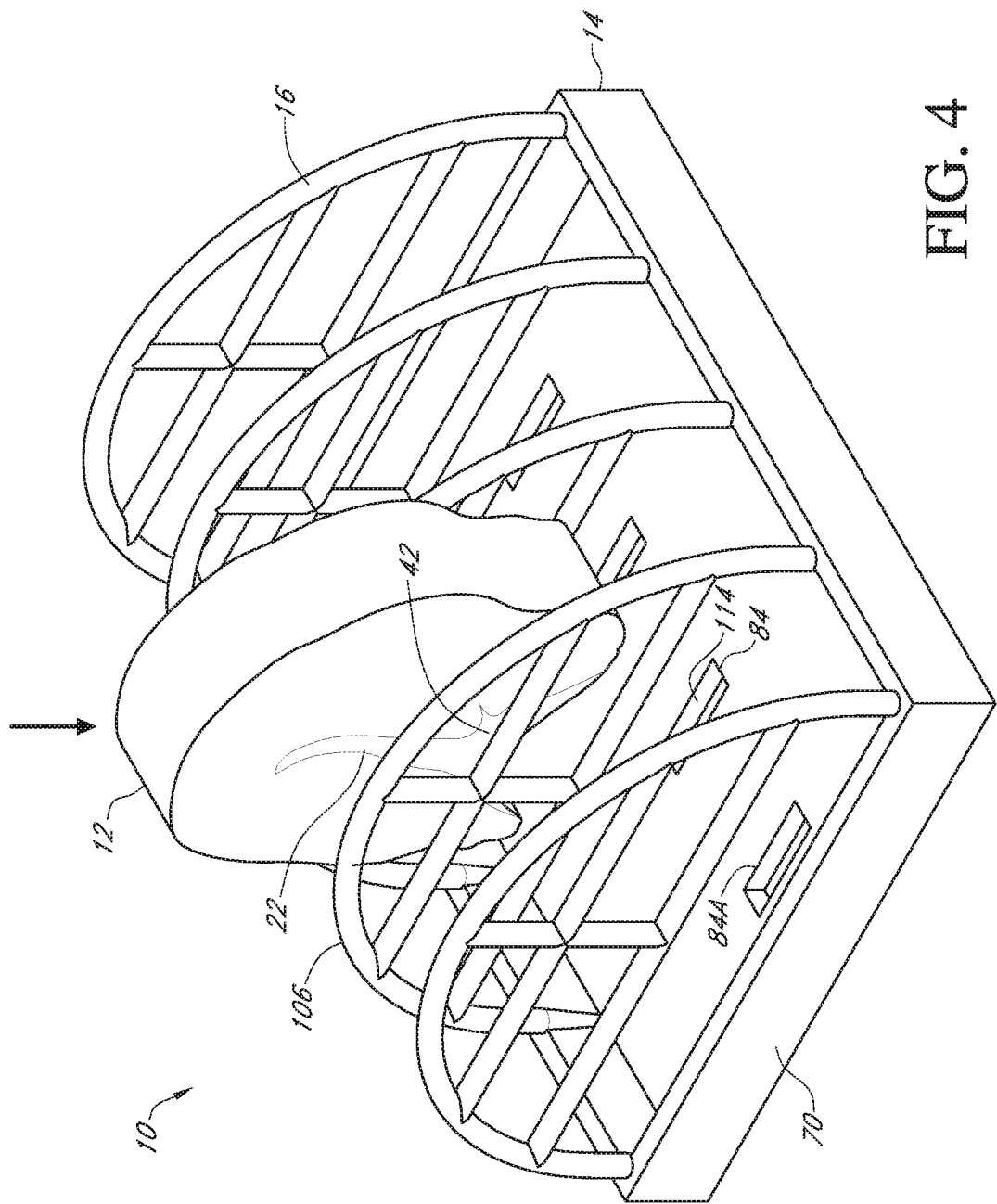
FIG. 4 is a perspective view of a chop rack in operation.
Figure 5:
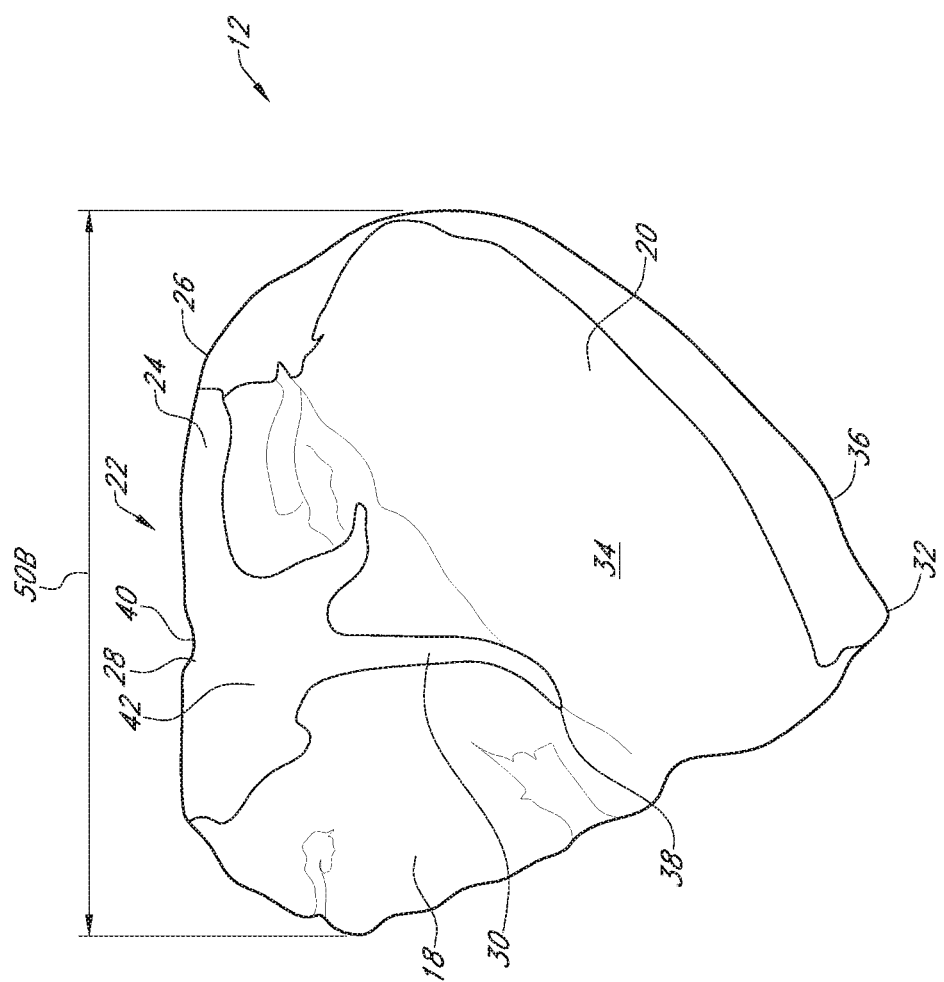
FIG. 5 is a perspective view of a pork loin chop.

With reference to the figures a pork chop rack or chop rack 10 is for cooking or grilling one or more pork loin chops or other bone-in meat products 12, such as a T-bone steak. For illustrative purposes, the present invention is described in relation to use with a pork loin chop 12. The chop rack has a tray 14 and, in some arrangements, one or more support frames 16. The chop rack 10 is constructed from heat resistant materials, and in a particular embodiment is made from food grade aluminum, such as 1100 aluminum, 3003 aluminum, or 3004 aluminum, in order to provide a light weight construction, thermal conductivity, and durability without the presence of lead.

The pork loin chop 12 comes in a variety of shapes, sizes, and thicknesses, however, each pork loin chop 12 has a tenderloin 18, a loin 20, and a generally T-shaped bone or bone 22. A first portion 24 of the T-shaped bone 22 extends along a bottom 26 of the pork loin chop 12. Extending near a midpoint 28 of the T-shaped bone 22 is a second portion 30 that extends generally perpendicular to the first portion 24. The second portion 30 extends away from the bottom 26 of the pork loin chop 12 towards a top 32 between a first side 34 and a second side 36 of the pork loin chop 12, thereby separating the tenderloin 18 and the loin 20. The second portion 30 generally tapers upwardly and inwardly from the first portion 24 to a point or end 38. Near to the connection of the first portion 24 and the second portion 30 near the midpoint 28 is a notch or indent 40 that extends inwardly into the first portion 24 opposite the connection of the second portion 30. An area 42 around this connection is typically the largest volume of bone of the T-shaped bone 22, which is the typically the best location to heat the pork loin chop 12 in order to evenly cook the pork loin chop 12 from the inside out.

The tray 14 of the chop rack 10 has a base 44, which in some embodiments is generally flat and planar. The base 44 extends between a top end 46 and an opposing bottom end 48 that form a length 50 of the base 44. The base 44 also extends between a first side end 52 and an opposing second side end 54 that form a width 56 of the base 44. The length 50 is generally divided into three portions, a top portion 58 that extends from the top end 46 to a middle portion 60, which extends from the top portion 58 to a bottom portion 62, wherein the bottom portion 62 extends from the middle portion 60 to the bottom end 48. In some arrangements, the top portion 58, the middle portion 60, and the bottom portion 62 cover approximately equal amounts of the length 50 of the base 44 and in one particular embodiment differ by less than 10%. The base 44 has a height 64 that extends between a top surface 66 and a bottom surface 68 of the base 44.

A sidewall 70 extends along and upwards from a perimeter or edge 72 of the base 44 formed by the top end 46, the bottom end 48, the first side end 52, and the second side end 54 of the base 44, which in some arrangements provides for a rectangular or enclosed shape formed by a first side 74, a second side 76, a third side 78, and a fourth side 80 such that the connection between sides converges at a corner 82. In some embodiments, the sidewall 70 is continuous, monolithically constructed, or integrated with the base 44, or both. The sidewall 70 has a height 64A that extends between a top end 46A and an opposing bottom end 48A that is connected to the base 44. The sidewall 70, in some arrangements, is configured such that the height 64A retains all or the majority of grease released from the pork loin chop 12, which reduces the possibility of a grease fire while allowing the pork loin chop 12 to cook in the grease thereby enhancing the flavor of the pork loin chop 12.

One or more slots or openings 84 are positioned through the base 44, which is otherwise solid in construction, which as shown in the illustrative embodiment have a rectangular shape in some embodiments such that the distance along the length 50 of the base 44 is greater than along the width 56.

In doing so, each slot 84 permits direct heating from a heat source 86 such as a grill—i.e. the upwardly rising heat from the heat source 86 is unobstructed by the tray 14 due to passage through the slot 84 compared to ambient heat inside the heat source 86 or thermally conducted by the tray 14. In this configuration, the T-shaped bone 22 of the pork loin chop 12 is provided sufficient exposure to direct heat while significantly limiting the potential for grease to pass through the slots 84.

The illustrative embodiment shows the equidistant positioning of the slots 84 from each other along the middle portion 60 of the base 44. An outer most slot 84A positioned closest to the first side end 52 or second side 54 is offset sufficiently from the sidewall 70 so that the outer most slot 84A does not abut the sidewall 70. In this arrangement, the same or substantially the same amount of space is provided between the sidewall 70 and the outer most slots 84A on each side and approximately twice that amount of space between each slot 84. This is done to provide approximately the same amount of space for each pork loin chop 12 positioned over the slots 84 while providing room, in some embodiments, for the support frames 16.

In some embodiments of the present invention, a plurality of notches or grooves 88 are formed in the sidewall 70 to receive the support frames 16. By forming the notches 88 within instead of extending from the sidewall 70, space is conserved and with it production costs. As seen in the illustrative embodiment of the invention in the Figures, the notches 88 are formed in each corner 82 of the sidewall 70 and equidistantly along the width 56 of the base 44, which in one embodiment results in five notches 88 positioned on opposing sides of the sidewall 70 along the width 56 of the base 44. In this configuration, the support frames 16 are receivable or insertable into or within each set of opposing notches 88 disclosed further herein across the length 50 of the base 44 and in parallel alignment with the other support frames 16. In some configurations of the present invention, no notches 88 are formed in the corners 82, but rather equidistantly spread along the width 56 of the base and away from the corners 82.

In some embodiments, the one or more notches 88 have a substantially uniform shape. In other embodiments, the notches 88 taper downwardly and inwardly from the top end 46A of the sidewall 70 to the opposing bottom end 48A. In this latter configuration, the tapering of the notches 88 allows for a superior friction fit of the support frames 16 as disclosed further herein while also permitting the removal of the support frames 16 with less effort.

The support frames 16 are configured to provide a physical barrier between pork loin chops 12 positioned therebetween while providing consistent heat through thermal conductivity from the heat source 86 to the first side 34 and the second side 36 of the pork loin chop 12. Each support frame 16 has an elongated rod 90, which in some embodiments is cylindrical, that extends from a first end 92 to a second end 94 in an arch or a generally arcuate fashion. As such, each support frame 16 has a first portion 96 that extends generally along the same plane from the first end 92 to a top portion 98 and a second portion 100 that extends along the same plane from the second end 94 to the top portion 98, such that the top portion 98 is between the first portion 96 and the second portion 100.

Extending from and between the first portion 96 and the second portion 100 is the top portion 98, which as shown in the illustrative embodiment is arcuate between the straight first portion 96 and second portion 100. The arcuate formation maximizes the overall distance between the first end 92 and the second end 94 to an apex 102 of the top portion 98 while limiting materials, thereby reducing manufacturing time and cost, and the amount of material used. In this configuration, the distance between the first end 92 and the second end 94 forms a height 64B of the support frame 16 in perpendicular relation to the base 44 and the distance between the first end 92 and the second end 94 forms the length 50A of the support frame 16 when viewed in relation to reception in the respective notches 88 as seen in the illustrative embodiment.

In some embodiments, the first portion 96 and the second portion 100 have a uniform size, shape, and diameter. In other embodiments, the first portion 96 and the second portion 100 each have a tapered portion 104 that tapers inwardly towards the first end 92 or second end 94 respectively, such that the first end 92 and second end 94 terminate with a diameter smaller than the remainder of the elongated rod 90. The tapered portion 104 is configured to be inserted in and engage the top end 46A at or near the widest or largest part of the tapered portion 104 and engage the bottom end 48A at the narrowest or smallest part of the tapered portion 104 located at the first end 92 or second end 94. In this arrangement, the disengagement between the tapered portion 104 and the respective notch 88 is nearly immediate due to the differences in dimension between the tapered portion 104 and the notch 88 that is tapered as the support frame 16 is removed. Likewise, engagement between the notch 88 and the tapered portion 104 does not occur until the support frame 16 is fully inserted into the notch 88. Hence, this configuration provides for superior friction fit between the tapered portion 104 and the notch 88 while allowing for easier removal and insertion.

Positioned within the support frame 16 are one or more rods or supports 106 that stabilize and further distribute thermally conducted heat from the heat source 86 through the tray 14. In some embodiments the supports 106 are cylindrical. As seen in the illustrative embodiment, there is a first horizontal rod or support 108 that extends between the first side portion 96 and the second side portion 100 at a transition point 116 where the top portion 98 begins or ends with respect to the first portion 96 and the second portion 100. A second horizontal rod or support 110 extends between the arc formed by the top portion 98, such that the second horizontal rod 110 is between the apex 102 and the first horizontal rod 108. In some arrangements of the present invention, a vertical rod or support 112 extends from the apex 102 through the second horizontal rod 110 and into the first horizontal rod 108. In this arrangement, the vertical rod 112 extends in parallel alignment with the first portion 96 and the second portion 100 and perpendicularly to the first horizontal rod 108 and second horizontal rod 110. In some embodiments of the present invention, the support frame 16 is continuous, monolithically constructed, or integrated with each respective element described herein.

In one embodiment of the present invention, the length 50 of the tray 14 is 6.5". The typical pork loin chop 12 has a length 50B of approximately 4". However, inconsistencies in the location and makeup of the T-shaped bone 22 requires different positioning based on the particular pork loin chop 12. At 6.5", the length 50 provides sufficient space to adjust the position of the pork loin chop 12 such that the midpoint 28 of the T-shaped bone 22 or the area 42 of the highest volume of bone can be positioned over a center 114 of the slot 84.

In this embodiment, the width 56 of the tray 14 is 8.5", which accommodates up to five typical pork loin chops 12 spaced approximately equidistantly from each other, thus providing the capability for simultaneous cooking or grilling. Simultaneously, at this width 56, there is little to no risk one or more of the pork loin chops 12 will fall over thereby negating the need for constant monitoring. At these dimensions, the tray 14 is also easily stored as disclosed further below.

The base 44 of the tray 14 has a height 64 of 0.25" that provides for rigidity, durability, and minimal weight when food grade aluminum is utilized.

The height 64A of the sidewall 70 extends 1" when measured from the bottom surface 68 of the base 44 and a width or thickness 56A of 0.25". At these dimensions, the sidewall 70 is sufficiently sized and shaped to be rigid and durable, while having a minimal weight. At the same time, the height 64A is sufficient to prevent or trap grease released from the pork loin chop 12 from leaking over the sidewall 70 resulting in a grease fire or flare in the heat source 86.

In this embodiment, five slots 84 are equidistantly spaced between each other and offset from the sidewall 70 such that approximately the same amount of space is allotted for each pork loin chop 12. The slots 84 extend directly downward from the top surface 66 to the bottom surface 68 to provide the most direct heating from the heat source 86, though other embodiments may taper upwardly or downwardly. With the width 56 of the tray 14 at 8.5", the outermost slots 84A are set away from the sidewall 70 by 0.875" at the first side end 52 and the second side end 54 and equidistantly positioned between the top end 46 and the opposing bottom end 48 of the base. Each slot 84 has a length 50C of 1.25" and a width 56B of 0.375" with 1.625" between each slot 84 and the next slot 84 across the width 56 of the tray 14.

At these dimensions, the slots 84 allow the correct positioning of the pork loin chop 12 along the length 50 of the base 44 and permits sufficient space between pork loin chops 12 for proper cooking or grilling without the potential for falling over onto the tray 14. These dimensions permit the T-shaped bone 22 or the area 42 of the highest volume of bone to be exposed to direct heat from the heat source 86, while limiting or preventing grease released from the pork loin chops 12 to leak through the slots 84 that can result in a grease fire or irregularity in cooking or grilling.

In related embodiments, the minimum length 50C and width 56B of the slots 84 is 1.0" by 0.25". Below the minimum, insufficient direct heating occurs resulting in extended or insufficient cooking or grilling. The maximum length 50C and width 56B of the slots 84 is 1.375" by 0.6". Above the maximum, there is a higher probability of grease leaking. When typically sized and shaped pork loin chops 12 are prepared, the distance between slots 84 should not exceed 2.0" as there is a high probability of falling resulting in uneven cooking or grilling.

In this embodiment, each notch 88 extends 0.125" into the thickness 56A of the sidewall 70 and 0.75" from the top end 46A to the top surface 66 of the base 44. In some embodiments, each notch 88 is consistently sized and shaped, for instance when the notch 88 is arcuate, the radius of the arc is 0.125" from the top end 46A to the opposing bottom end 48A. As seen in the illustrative embodiment, the notches 88 taper from 0.25" at the top end 46A to 0.125" at the opposing bottom end 48A. Each notch 88 along the width 56, including the corners 82, are equidistantly spaced.

In this embodiment, the support frames 16 have a length 50A of 6.25" and a height 64B of 4.25". This permits the support frames 16 to be removed from the notches 88 and laid inside the tray 14 due to the larger dimensions of the tray 14 and be generally retained therein by the sidewall 70. As shown in the illustrative embodiments, the elongated rod 90 has a dimension of 0.25", which permits the radius of the elongated rod 90 to be received in opposing notches 88 during assembly. The first horizontal rod 108 extends 5.75" between the elongated rod 90 and the second horizontal rod 110 extends 4.25" between the elongated rod. The vertical rod extends 1.75" from the apex 102 into the first horizontal rod 108.

In other embodiments, some but not all of these dimensions are present, are substantially the same as disclosed, e.g. within 0.1" as disclosed, or both.

In operation, an individual inserts one or more support frames 16 into the tray 14. The meat product 12 is then seared on the first side 34 and second side 36. In the case of a pork loin chop 12, searing is completed by cooking or grilling for one to two minutes on each side 34, 36 at approximately 450° F. Searing locks in the juices of the meat product 12 to prevent drying out or poor taste.

The T-shaped bone 22 or area 42 with the highest volume of bone for each meat product 12 is positioned over the center 114 of the slot 84, i.e. bone-down over the slot 84. The meat product 12 is then cooked or grilled, which for pork loin chops 12 is a twenty-minute cook or grill at 450° F. Times may vary based on the actual density of the meat product 12 and environmental conditions.

While cooking or grilling, the T-shaped bone 22 is directly heated by the heat source 86 such that heat rising from the heat source is unobstructed by the tray 14 by passing through the slot 84. As a result, the T-shaped bone 22 of the meat product 12 is heated causing a higher temperature thereby cooking the meat product 12 from the inside out. Grease that is released while cooking or grilling is trapped within the tray 14 by the sidewall 70 and the coverage of the slots 84 by the meat product 12. In the event that grease passes through the slot 84, any increase in heat from the heat source 86 is directed to the T-shaped bone 22 through the slot 84 limiting, if not inhibiting, uneven cooking or grilling of the meat product 12.

When the meat product 12 is cooked, the chop rack 10 is disassembled by removing the support frames 16 from the tray 14 and cleaned. To store the chop rack 10, the support frames 16 are placed on the tray 14 within the sidewall 70 thereby minimizing the profile of the chop rack 10.

Therefore, a chop rack 10 has been provided that stabilizes a pork loin chop while cooking or grilling in a bone-down position; consistently exposes a pork loin chop to a heat source; exposes only a bone of a pork loin chop to direct heat from a heat source; limits grease from leaking and limits the potential of grease fires; limits exposure to irregular heat in the event of a grease fire; does not require constant supervision; is simple to use, durable, and cost-effective, and improves upon the art.

From the above discussion and accompanying figures and claims it will be appreciated that the chop rack 10 offers many advantages over the prior art. It will be appreciated further by those skilled in the art that various other modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A chop rack comprising:
a tray having a base;
the base having a top portion, a middle portion, and a bottom portion;
a row of slots positioned in the middle portion, wherein each slot is configured to only expose a bone of a meat product to a direct heat source such that the bone is heated to a higher temperature than the rest of the meat product and limit grease from the meat product passing through the slot;
a perimeter of the tray having a continuous sidewall, wherein the sidewall is configured to retain the grease from the meat product within the tray;
wherein the top portion and bottom portion are solid; and
a meat product having a bone, wherein the bone is positioned directly over the at least one slot such that the bone is the only portion of the meat product exposed to a direct heat source such that the bone is heated to a higher temperature than the rest of the meat product and grease is retained within the tray due to the bone covering the at least one slot.

2. The chop rack of claim 1 further comprising the base having a length and a width configured to receive multiple meat products along the width at a position along the length.

3. The chop rack of claim 1 further comprising at least one support frame having an elongated rod insertably received in opposing notches within the continuous sidewall.

4. The chop rack of claim 3 wherein the elongated rod has an arcuate shape.

5. The chop rack of claim 1 wherein the top portion, the middle portion, and the bottom portion cover approximately equal amounts of a length of the base.

6. The chop rack of claim 5 wherein the coverage between the top portion, the middle portion, and the bottom portion differs by less than 10% from one another.

7. The chop rack of claim 1 wherein each slot has a generally rectangular shape.

8. The chop rack of claim 1 wherein each slot has a length no more than 1.375".

9. The chop rack of claim 1 wherein each slot has a width no more than 0.6".

10. The chop rack of claim 1 wherein each slot has a length greater than 1.0".

11. The chop rack of claim 1 wherein the middle portion of the base is solid except for the at least one slot.

12. A method for cooking a meat product having a bone on a chop rack comprising:
providing a tray having a base, wherein the base has a top portion, a middle portion, and a bottom portion;
providing a row of slots that is positioned along the middle portion;
providing a heat source; and
positioning the meat product having the bone directly over a slot of the row of slots such that the bone is the only portion of the meat product exposed to the direct heat source.

13. The method of claim 12 wherein the row of slots are equidistantly positioned from each other.

14. The method of claim 13 wherein the base is solid except for the row of slots.

15. A chop rack comprising:
a tray having a base;
the base having a top portion, a middle portion, and a bottom portion;
at least one slot positioned in the middle portion; and
a meat product having a bone, wherein the bone is positioned directly over the at least one slot such that the bone is the only portion of the meat product exposed to a direct heat source such that the bone is heated to a higher temperature than the rest of the meat product.

16. The chop rack of claim 15 wherein the bone is positioned such that while cooking, grease from the meat product is prevented from passing through the slot.

17. The chop rack of claim 15 wherein the tray has a length of 6.5 inches and a width of at least 8.5 inches.

18. The method of claim 12 further comprising the step of limiting grease from the meat product passing thorough the slot.

19. The chop rack of claim 1 wherein the base has only one row of slots and the slots are substantially the same size and shape.

* * * * *